Oct. 14, 1969  W. L. FLOEHR  3,472,179
CABLE DRIVE DISCHARGE GATE ACTUATING ASSEMBLY
Filed April 2, 1968  2 Sheets-Sheet 1

Inventor:
Walter L. Floehr
By Wilmer Mechlin
his Attorney

Oct. 14, 1969  W. L. FLOEHR  3,472,179
CABLE DRIVE DISCHARGE GATE ACTUATING ASSEMBLY
Filed April 2, 1968  2 Sheets-Sheet 2

Inventor:
Walter L. Floehr
By Wilmer Mechlin
his Attorney

# United States Patent Office 3,472,179
Patented Oct. 14, 1969

3,472,179
CABLE DRIVE DISCHARGE GATE ACTUATING ASSEMBLY
Walter L. Floehr, 1043½ Nebraska Ave., Toledo, Ohio 43607
Filed Apr. 2, 1968, Ser. No. 718,184
Int. Cl. B61d 7/02; B60p 1/56
U.S. Cl. 105—282　　　　　　　　　　　11 Claims

ABSTRACT OF THE DISCLOSURE

A railway hopper car discharge gate assembly having a gate slidable between open and closed positions on a frame and driven between those positions by a windlass stationarily mounted on the frame and wrapped by a cable anchored at its extremities to opposite end portions of the underside of the gate, the cable being endless with its slack incrementally adjustable by a cam mounted on the gate.

BACKGROUND OF THE INVENTION

Conventionally, a discharge gate of a railway hopper car is driven between open and closed positions on a supporting frame by a rack and pinion drive, the unavoidable vertical component of the force of which, by tending to separate the gate from the frame as it moves therealong, interferes with a close fit between the gate and the frame. The discharge gate assembly disclosed in my copending application Ser. 600,477, filed Dec. 9, 1966, solved this problem by driving the gate between open and closed positions by a cable drive having a cable anchored to and extending longitudinally of the gate frame and an operating shaft or windlass wrapped by the cable and connected for longitudinal movement in unison to the gate. The present invention, while also employing a cable drive for solving the problem of close fit between the gate and the frame, is primarily directed to an improvement on the assembly of my earlier application.

SUMMARY OF THE INVENTION

The primary object of the present invention is to provide an improved lading gate assembly for a railway freight car whereby a gate member is driven longitudinally between open and closed positions on a frame member by a cable drive having a cable anchored at its extremities to one of the members and an operating shaft wrapped by the cable intermediate its extremities and connected for rotation and against relative longitudinal movement to the other members. Another object of the present invention is to provide an improved railway hopper car discharge gate assembly having a cable drive which not only eliminates any separating force between the gate and the frame in driving the gate between open and closed positions, but renders unnecessary extension of the frame to cover the range of movement of the gate.

A further object of the invention is to provide an improved discharge gate operating assembly having a cable and windlass drive, wherein the cable is mounted on the underside of the gate and the cooperating windlass is stationarily mounted on the frame below the gate and clear of the discharge opening.

In the application for which it was particularly designed, the improved gate operating assembly includes a frame rigidly mountable on a downwardly opening hopper of a railway hopper car and bounding a discharge opening thereof. A gate slidably mounted on the frame is drivable between positions to open and close the discharge opening and so driven by an endless cable mounted on the underside of the gate with its extremities anchored to the gate's opposite end portions and a windlass wrapped by the cable intermediate its extremities and stationarily mounted on the frame clear of the discharge opening therein and below the gate. An incrementally adjustable cam mounted on the front portion of the gate adjusts the slack in the cable and the rear cable anchor and cooperating seals both limit the opening movement of the gate and aid in sealing against leakage of lading in the gate's open position.

The foregoing and other objects and features of the invention will appear hereinafter in the detailed description, be particularly pointed out in the appended claims and be illustrated in the accompanying drawings, in which:

FIGURE DESCRIPTION

DETAILED DESCRIPTION

Figure 1:
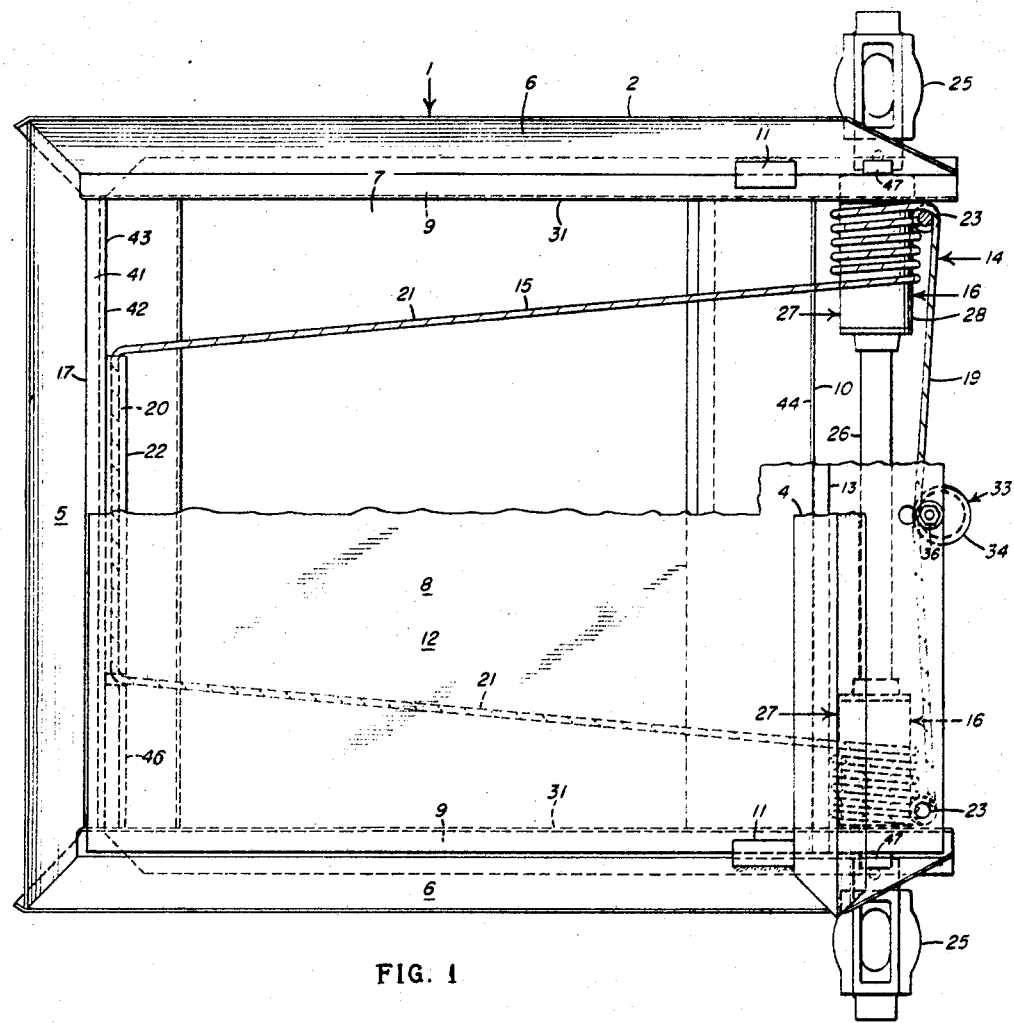
FIGURE 1 is a plan view of a preferred embodiment of the cable drive lading gate assembly of the present invention with portions broken away to show more clearly certain details of construction.
Figure 2:
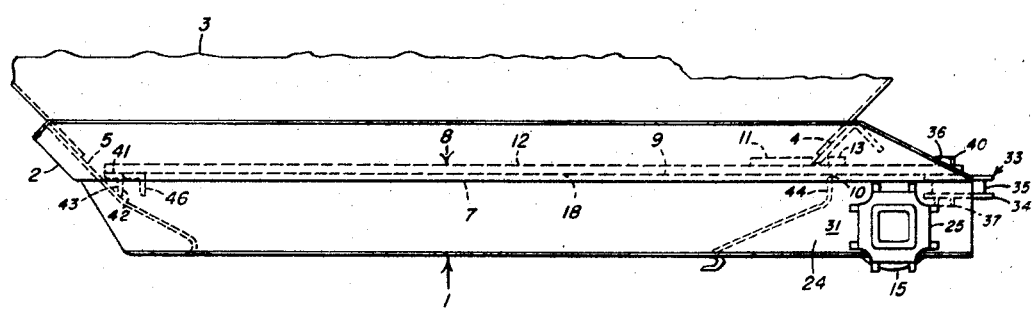
FIGURE 2 is a side elevational view of the assembly of FIGURE 1 applied to a hopper of a railway hopper car.
Figure 3:
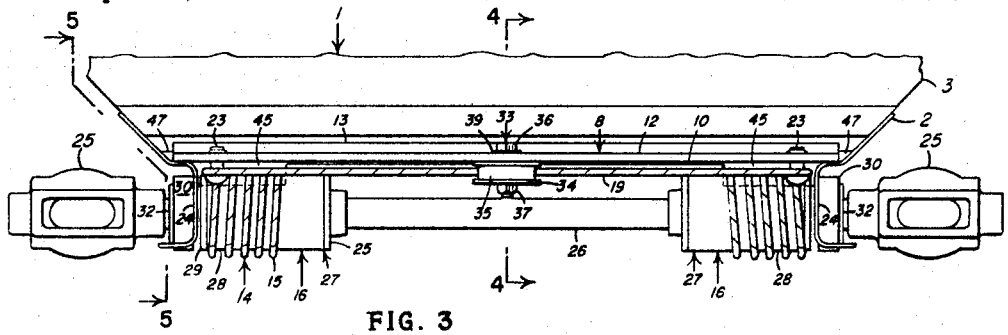
FIGURE 3 is a front elevational view of the structure of FIGURE 2.
Figures 6, 7:
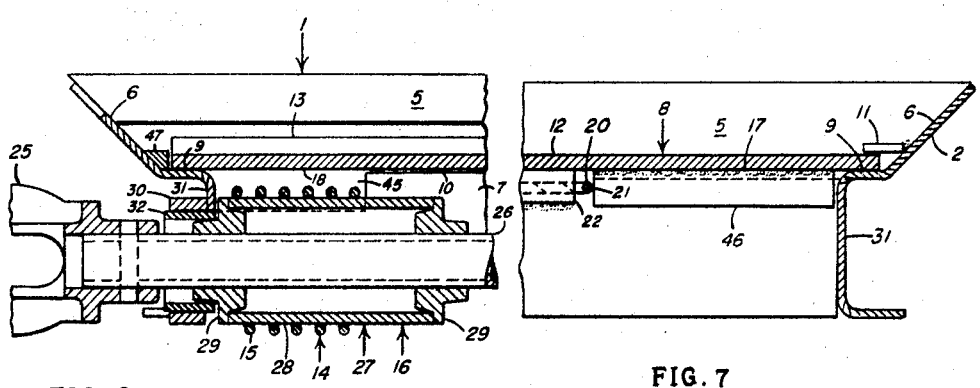
FIGURE 6 is a fragmentary vertical sectional view taken along lines 6—6 of FIGURE 4.
FIGURE 7 is a fragmentary vertical sectional view taken along lines 7—7 of FIGURE 4.
Figure 4:
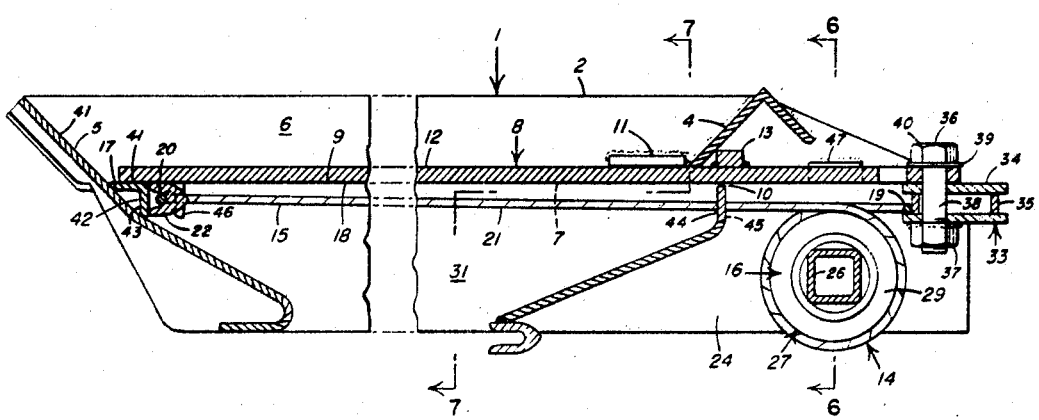
FIGURE 4 is a vertical sectional view taken along lines 4—4 of FIGURE 3.
Figure 5:
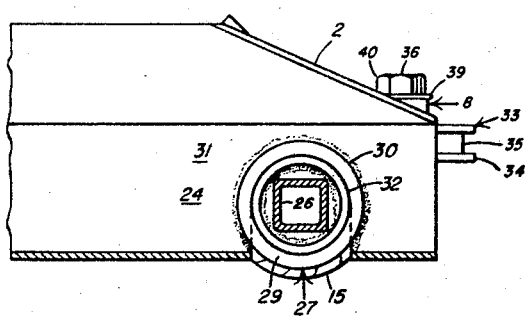
FIGURE 5 is a fragmentary vertical sectional view taken along lines 5—5 of FIGURE 3.

Referring now in detail to the drawings, in which like reference characters designate like parts, the improved cable drive lading gate assembly of the present invention, while applicable to any railway freight car having a lading opening closeable by a longitudinally moveable gate, is particularly designed for application to downwardly opening or discharging hoppers of railway hopper cars and has been so illustrated as exemplary of the invention.

As does the assembly of my copending application Ser. No. 600,477, the assembly of this invention uses, for driving a discharge gate member between open and closed positions in a frame member, a cable drive having a cable extending longitudinally or in the direction of movement of and anchored at its extremities to one of the members and a windlass or operating shaft connected for rotation and against relative longitudinal movement to the other member. However, as opposed to the embodiment of the earlier application, that of this application anchors the cable to the gate member and mounts the windlass stationarily on the frame member, with consequent compactness of the assembly and drastic reduction in the overall length of its frame member.

In the embodiment of this invention, the improved assembly, designated as 1, is comprised of a frame or frame member 2 fixedly mountable, as by welding or rivetting, on the bottom of a downwardly opening or discharging hopper 3 of a railway hopper car (not otherwise shown). Suitably rectangular in horizontal cross-section to conform to a conventional hopper, the preferred frame has a front wall 4, a rear wall 5 and side walls 6, together bounding a horizontally disposed, downwardly opening hopper discharge opening 7 within the frame intermediate its vertical extremities. A discharge or slide gate or gate member 8, which simply may be a plate of suitable dimensions, is slidably mounted in the frame 2 for movement between positions to open and close the discharge opening 7. Slidably supported at the sides on laterally spaced, parallel and horizontally extending slide or guide rails 9, integral or rigid with or fixed to the side walls 6, the gate 8 projects or extends through a laterally elongated, gate-receiving opening 10 in the front wall 4 and is guided against canting by guide shoes or brackets overlying and engaging or engageable with its upper surface 12 adjacent its sides and fixed to or rigid with the side walls 6 adjacent and inwardly of the front wall 4. Preferably, a block or other suitable backstop 13, fixed to or rigid with the upper surface 12 outwardly of the front wall 4 and engaging that wall in the gate's closed position, is provided to minimize leakage of finely divided lading through joint between that wall and the gate.

For driving the gate 8 between open and closed positions, the improved assembly 1 has a cable drive 14 including a cable 15 mounted on or carried by and extending longitudinally of the gate and anchored at opposite extremities thereto and a windlass 16 wrapped by the cable intermediate its extremities and extending transversely or laterally of or across and mounted stationarily or against relative longitudinal movement on the frame. To hold the gate, as it is driven between open and closed positions, on its seat 17 on the frame, of which the slide rails 9 form the side parts, at least the windlass 16 and preferably also the cable 15 as a whole should be positioned or located on the same side of the gate as the seat. Thus, in the illustrated assembly in which the seat 17 is upwardly facing and the gate rests by gravity thereon, the cable suitably is mounted on and depends from and the windlass is below the gate's underside 18.

Anchored at its extremities to opposite end portions of the gate 8, the cable 15 may be an ended cable either with its ends as extremities or looped at one extremity with its ends separately anchored at the other. However, it is preferred that the cable be endless, as by forming it of one or a plurality of cable sections of suitable length joined by clamping at their ends, and be looped at both extremities with its front or outer and rear or inner loops 19 and 20, respectively, centered laterally on and its legs 21 therebetween, spaced equidistantly from the longitudinal center-line of the gate. Rather than being fixed at their anchorages, the inner and outer loops 19 and 20 preferably slide or run freely therein to equalize the driving force applied to the gate through the legs 21 by the windlass 16. For such anchorages, the cable suitably has a rear anchor 22 a rearwardly opening channel centered laterally on and fixed to or rigid with the underside 18 of the gate adjacent the latter's rear end and as a front anchor 23 a pair of headed anchor posts or studs fixed to and depending from the underside of the gate adjacent its front corner.

Stationary or fixed against longitudinal movement relative to the frame 2, the windlass 16 is rotatably mounted or journalled in the frame with its rotative axis horizontal or parallel to the gate 8 and normal to the latter's path of movement. The windlass, as well as the cable 15, preferably is disposed or positioned below the gate and within the longitudinal extremities of the cable and the gate and conveniently is mounted forwardly of the frame's front wall 4 in short or stub, front or forward extensions 24 of the side walls 6. Protected by the front wall from discharging lading, the preferred windlass extends laterally across the frame and through the side walls 6 and, therebeyond, has on each end an operating head 25 so as to be operable from either side of a car by a suitable turning tool (not shown) applied to either head.

To minimize manufacturing costs without impairing ruggedness or efficiency, the bulk of the components of the improved assembly preferably are weldments formed mainly of structural shapes and this particularly holds true of the windlass 16 and its mounting. Thus, the preferred windlass has as its shaft or spindle 26 a length of square tubing having the operating heads 25 fixed to its ends and non-rotatably mounting between those ends and the frame's side walls 6 one or more drums or barrels 27, the number depending on the form of the cooperating cable 15. For the illustrated two-legged cable, the windlass has a pair of axially spaced drums 27, each at one side of the frame's longitudinal centerline and adjacent one of the side walls and wrapped by one of the legs 21 of the cable. Each drum has as its cylindrical side 28 a pipe section and as its ends 29 end or hub castings apertured to receive the shaft 26. Journal bearings 30 for the windlass are short pipe sections welded to the outsides of vertical webs 31 of the side walls 6 below and inwardly of the preferably integral portions thereof serving as the horizontally extending guide or side rails 9 on which the gate 8 slides, and, for journals 32, the windlass has pipe sections of smaller diameter each fixed to and outstanding from an adjoining drum end 29 and extending through and rotatable in the bearing or bushing 30 at that side.

For taking up slack in the cable 15, as necessary to provide a non-slip driving connection between the drums 27 and the wrappings or windings of its legs 21 thereabout, the improved assembly 1 includes a slack adjuster 33 preferably formed of a cam or eccentric 34 having a peripheral groove 35 for receiving or engaging the cable and rotatably mounted on and suspended from the underside 18 of the gate 8 by a bolt 36 extending vertically through the cam and the gate. Conveniently mounted and centered laterally on the front end portion of the gate forwardly of and engaging the front loop 19 of the cable intermediate the front anchor posts 23, the slack adjuster 33 enables the slack of the cable 15 to be incrementally adjusted by having a nut 37 welded or otherwise fixed to the underside of the cam 34 and threaded onto the stem 38 of the bolt 36 and a lock washer 39 between the bolt's head 40 and the gate's upper surface 12. A pair of wrenches (not shown), one applied to the head 40 and the other to the nut 37, enable the cam to be released for turning relative to the gate, then turned through the nut to adjust the cable slack as desired and finally locked in adjusted position, the last by tightening the bolt.

With the cable slack so adjustable and both the cable 15 and the windlass 16 mounted below the gate 8, turning of the windlass will apply a horizontal or a combined horizontal and downward driving force to the gate, depending on whether the portions of the legs 21 at opposite sides of the drums 27 are horizontally aligned or angularly related and inclined downwardly toward the windlass. Substantial horizontal alignment, with the cable legs wrapped over rather than under the drums, usually will suffice, with the overlying guide shoes 11, to hold the gate against canting or tilting in open position, even if, as preferred, the front extensions 24 of the side walls 6, over which the guide rails 9 preferably extend, are only of sufficient length to accommodate the front portion of the gate and the underlying windlass in the gate's closed position. Such substantial horizontal alignment of the cable leg portions consequently is preferred as enabling substantially the full driving force applied by the windlass to the cable to parallel the path of movement of and act longitudinally on the gate.

In closed position, the gate 8, for sealing against leakage of lading through the discharge opening 7, has substantially a sliding fit with the front wall 4 above the gate-receiving opening 10, in addition to its sliding fit with the guide rails 9 on the side walls 6, and seats at the rear on a shelf or ledge 41 fixed to or rigid with and instanding from the rear wall 5 and extending thereacross coplanar with and joined at ends to the guide rails. The gate rearwardly overhangs or extends beyond the rear cable anchor 22 on its underside 18 for engagement with the shelf 41, and, by forming the shelf as the horizontal leg of an angle or angle iron 42 presenting its downstanding vertical leg 43 for engagement by the rear anchor 22, the latter and the downstanding leg are enabled to serve as stops for limiting by their engagement the inward or rearward movement of the gate.

The rear anchor 22 also is employed to limit outward or opening movement of the gate, in this case by engagement with a vertically directed shoulder or abutment portion 43 of the front wall 4 directly below the gate-receiving opening 10, between side slots 45 in that portion for passing the legs 21 of the cable. For substantially closing those slots 45 during discharge, the gate preferably carries on and has fixed to or rigid with its underside at opposite sides of and laterally aligned with and sandwiching the rear anchor 22, a pair of seals 46, which, if angles of the same width as the rear anchor, can act with it as stops for limiting the opening and closing movements of the gate, as well as for closing the slots in the gate's open position. By extending the preferred angle seals 36 outwardly from the rear anchor 22 substantially through the vertical webs 31 on the side walls 6 and fixing to the side walls at opposite sides of the gate and suitably forwardly of the front wall 4, side guides 47 for engagement with the gate's front portion, the gate will effectively be laterally positioned or centered on the frame 2, both in close position and in moving between open and closed positions.

Requiring no gearing and of minimum length due to its rotatable rather than rollable mounting of the windlass 16, the improved assembly affords maximum compactness with relative simplicity and ruggedness in construction, as well as a closer fit between the gate 8 and its seat 17 on the frame 2 and consequent better metal-to-metal sealing than is possible with the conventional rack and pinion driven gate of the conventional assembly. As will be understood, the disclosed embodiment is merely exemplary of the invention and all modifications are intended to be included that do not depart from the spirit of the invention and the appended claims.

Having now described my invention, I claim:

1. A lading gate assembly for a lading opening of a railway freight car, comprising a frame member mountable on said car and bounding said opening thereof, a gate member movable longitudinally in said frame member between positions to open and close said opening, and a cable drive for driving said gate member between open and closed positions, said drive including a plurality of cable lengths extending coextensively longitudinally of and each anchored at opposite longitudinal extremities to one of said members, and an operating shaft wrapped toward opposite ends thereof by said cable lengths intermediate said extremities thereof and connected for rotation and against relative longitudinal movement to the other member for moving said gate member between open and closed positions.

2. A lading gate assembly according to claim 1 for a downwardly discharging hopper of a railway hopper car, wherein the opening bounded by the frame member is a downwardly opening discharge opening of said hopper, the gate member is a discharge gate member longitudinally slidable in the frame member, the cable lengths are anchored to the gate member and the operating shaft is a windlass rotatably mounted on the frame member.

3. A discharge assembly according to claim 2, wherein the gate member in closed position seats on an upwardly facing seat in the frame member, and the cable lengths and windlass are both positioned below the gate member.

4. A discharge gate assembly according to claim 3, wherein the gate member extends through a gate-receiving opening in a front wall of the frame member, and the windlass rotates about an axis stationary relative to the frame member, normal to the path of movement of the gate member and longitudinally contained by the extremities of the cable lengths.

5. A discharge gate assembly according to claim 4, including means mounted on the gate member and engaging the cable lengths for adjusting the slack thereof.

6. A discharge gate assembly according to claim 5, wherein the cable lengths are parts of a single cable, and the slack adjusting means includes a cam suspended from and turnable parallel to the gate member, and means for enabling the cam to be turned to and locked in any position for incrementally adjusting the slack of the cable.

7. A discharge gate assembly according to claim 6, wherein the enabling means includes a headed bolt extending through and rotatable relative to the gate member and cam, and a nut fixed to the cam and threaded onto the bolt, and the cam is peripherally grooved for engaging the cable.

8. A discharge gate assembly according to claim 7, wherein the cable is endless and has loops at both extremities, longitudinally spaced anchors fixed to the underside of the gate members slidably receive said loops, and the slack adjuster is laterally centered on the gate member forwardly of and engaging with a front of said loops.

9. A discharge gate assembly according to claim 2, wherein the windlass includes a shaft of square tubing extending through opposite side walls of the frame member, barrel means on the shaft within the frame member and having axially spaced cast ends non-rotatably receiving said shaft and a pipe section journal fixed to and projecting from a barrel end through an adjacent side wall, and including a pipe section bearing fixed to an outside of each of said side walls for receiving said journals.

10. A discharge gate assembly according to claim 4, wherein the frame has front and rear walls, and including longitudinally spaced rear and front anchor means fixed to the underside of the gate member respectively between said walls and forwardly of said front wall, and stop means on said walls and engageable by said rear anchor means for limiting the opening and closing movements of the gate member.

11. A discharge gate assembly according to claim 10, including means on said members for limiting lateral movement therebetween.

References Cited

UNITED STATES PATENTS

| | | | |
|---|---|---|---|
| 396,140 | 1/1889 | Canda | 105—282 |
| 887,225 | 5/1908 | Post | 298—27 |
| 1,122,918 | 12/1914 | Hart et al. | 105—282 X |
| 1,342,090 | 6/1920 | Campbell | 105—302 |
| 2,859,707 | 11/1958 | Dorey | 105—282 X |
| 3,082,706 | 3/1963 | Dorey | 105—282 |
| 3,185,528 | 5/1965 | Peterson | 105—240 X |

ARTHUR L. LA POINT, Primary Examiner

H. BELTRAN, Assistant Examiner

U.S. Cl. X.R.

105—295, 300, 306; 298—27